United States Patent [19]
Sawada et al.

[11] Patent Number: 5,501,538
[45] Date of Patent: Mar. 26, 1996

[54] APPARATUS AND METHOD FOR ADJUSTING CHARACTER SPACING

[75] Inventors: Akira Sawada, Nagaokakyo; Hiroshi Kumamoto, Osaka; Takashi Suzuki, Nagoya, all of Japan

[73] Assignee: Omron Corporation, Kyoto, Japan

[21] Appl. No.: 263,148

[22] Filed: Jun. 21, 1994

[30] Foreign Application Priority Data

Jun. 25, 1993 [JP] Japan .................................. 5-155905

[51] Int. Cl.$^6$ ....................................... B41J 19/32
[52] U.S. Cl. ........................... 400/304; 400/76; 400/110; 395/151
[58] Field of Search ............... 400/9, 1, 15, 76, 400/304, 306, 279, 320, 322, 109, 110; 395/102, 108, 110, 150, 117, 151

[56] References Cited

U.S. PATENT DOCUMENTS

| | | | |
|---|---|---|---|
| 4,225,249 | 9/1980 | Kettler | 400/9 |
| 5,230,572 | 7/1993 | Hirono | 400/9 |
| 5,432,890 | 7/1995 | Watanabe | 395/150 |

FOREIGN PATENT DOCUMENTS

| | | | |
|---|---|---|---|
| 196280 | 11/1984 | Japan | 400/9 |
| 3-244542 | 10/1991 | Japan | 400/304 |

Primary Examiner—Edgar S. Burr
Assistant Examiner—Steven S. Kelley
Attorney, Agent, or Firm—Dickstein, Shapiro & Morin

[57] ABSTRACT

Disclosed is a system for automatic adjustment of character spacing suited to characters in innumerable combinations, such as in the case with Chinese characters and hiragana and katakana characters in the Japanese language. In character dot data of a plurality of characters which construct a character string developed in memory, character density data representing the broadness of the character face of a character, character face overlap area data representing degree of overlap between this character and a character adjacent thereto in a state in which the character and adjoining character are closest to each other, and blank-space area data representing the broadness of blank space produced between the two characters are generated for each and every character. The appropriate character spacing is inferred for each character through fuzzy reasoning by applying the character density data, character face overlap area data and blank-space area data to already given knowledge relating to character spacing adjustment.

26 Claims, 16 Drawing Sheets

APPARATUS AND METHOD FOR ADJUSTING CHARACTER SPACING

BACKGROUND OF THE INVENTION

1. Field of the Invention

This invention relates to an apparatus and method for adjusting the spacing between characters in a printed character string in a computerized typesetting system, phototypesetting machine or word processor, etc., so as to make the character string easier to read and more attractive.

In this specification, the meaning of the term "character" covers all types of letters, symbols, signs, numerals and figures used to express will, thoughts and emotions, etc. Typical characters include Chinese characters (inclusive of Chinese numerals), hiragana and katakana in the Japanese language, the Hangul alphabet, the Roman alphabet, Greek letters, Arabian numerals, Roman numerals, hyphens, commas and colons, etc.

2. Description of the Prior Art

The adjustment of character spacing in a character string arrayed in the horizontal or vertical direction is one important operation in typesetting for printing purposes. In text which contains Chinese characters (hereinafter referred to as kanji), hiragana and katakana, especially headlines and advertisements appearing in leaflets, the impression which these characters have upon the reader is extremely important. This makes it necessary to perform kerning (adjustment of character spacing) in appropriate fashion.

A character spacing adjustment conventionally is carried out by a skilled operator. If the individual performing the operation does not possess sufficient experience, the operation cannot be carried out and the efficiency thereof declines.

An example of an apparatus that automates character spacing adjustment is proposed in the specification of Japanese Patent Application Laid-Open (KOKAI) No. 3-244542. According to the proposed art, an imaginary region (zone) of a fixed width is set along the outline of each character on the outer side thereof. The spacing between two adjacent characters is decided in such a manner that parts of the outer edges of the imaginary zones will contact each other. Alternatively, character spacing is adjusted in such a manner that the area of overlap between two adjacent imaginary zones maintains a fixed value.

With this automatic adjustment of character spacing, however, the spacing between characters is adjusted in dependence solely upon the outlines of the characters; other essential elements of the characters are not taken into consideration. For example, the broadness of the area of character faces, complexity and relationship between neighboring characters are not taken into account even though these are important factors that have an influence upon character spacing.

SUMMARY OF THE INVENTION

An object of the present invention is to provide an apparatus and method for automatically performing a character spacing adjustment that fully takes into account the impression (the area of a character face, etc.) given by a character as well as the relationship between mutually adjacent characters.

The present invention is so adapted as to perform automatic adjustment of character spacing that takes character size into account, especially position with regard to small characters.

Further, the present invention is so adapted as to make it possible to achieve overall balance upon giving consideration also to the length of a row of a plurality of characters.

An apparatus for adjusting character spacing according to the present invention comprises first characteristic-quantity generating means for generating, character by character, a first characteristic quantity relating to the character in character dot data of a plurality of characters developed in a memory, second characteristic-quantity generating means for generating, character by character, a second characteristic quantity representing a relationship between the character and a character adjacent thereto in the character dot data of the plurality of characters developed in the memory, and character spacing inferring means for inferring an appropriate character spacing character by character by applying the first characteristic quantity and the second characteristic quantity to knowledge relating to character spacing adjustment.

The most typical example of the first characteristic quantity is character density data representing the broadness of a character face.

The most typical example of the second characteristic quantity is character face overlap area data representing degree of overlap between both characters in a state in which a character of interest and a character adjacent thereto are closest together, or blank-area data representing broadness of a space produced between both characters in a state in which a character of interest and a character adjacent thereto are closest together.

In accordance with the present invention, the proper character spacing is inferred on the basis of a characteristic quantity possessed by the character itself and a characteristic quantity produced between two mutually adjacent characters. There are a very large number of combinations of character pairs in text which is a mixture of kanji, hiragana and katakana. It is nearly impossible to determine all optimum character spacings with regard to all of these combinations in advance. According to the present invention, a character string is formed and the proper character spacing is decided upon considering not only the characteristic quantities possessed by each character but also the interrelationship between two adjacent characters, which is determined by the character combination, on each occasion.

In inferring the spacing between characters, it is preferred that consideration be given also to data representing the extent of character spacing desired and entered by the operator.

Furthermore, it is preferred that the character spacing inference take into account one, two or more items of data from among first ratio data relating to a ratio of minimum character spacing to character width, where minimum character spacing represents character spacing when a character of interest and a character adjacent thereto are closest together, second ratio data relating to a ratio of minimum character spacing to character height, where minimum character spacing represents character spacing when a character of interest and a character adjacent thereto are closest together, and character overlap complexity data representing complexity with which both characters overlap each other in a state in which a character of interest and a character adjacent thereto are closest together. By virtue of this inferential processing that takes the foregoing into account, the characterizing features of characters and the features between characters are reflected in character spacing more precisely.

When an adjacent character is small, preferably the above-described inferring of character spacing is performed with regard to the position at which the small character is developed into dot data as well as the position to which the small character is shifted a prescribed number of dots up or down. The smallest among a plurality of character spacings obtained by this inference of character spacing is decided on as being the proper character spacing. As a result, a small character is attached at the smallest spacing to the character that precedes it (or that follows it). This is a spacing adjustment that takes into account the manner in which small characters are used.

When the proper character spacing with regard to all characters contained in a given character string or at least one line of a character string is found by the above-described inferring operation, a spacing correction that takes the overall balance of the character string into account preferably is performed as follows:

Length data is produced that relates to the length of a row of a plurality of characters, inclusive of a character of interest, arrayed in one row at the character spacing obtained by the inference of character spacing described above. By applying the length data produced to knowledge relating to a character spacing correction given in advance, the amount of spacing correction is inferred for every character of interest. The final character spacing is produced by adding the amount of spacing correction, which has been obtained by inferring the amount of spacing correction, to the character spacing obtained by inferring the character spacing.

The present invention provides also a method of adjusting character spacing.

The method of adjusting character spacing comprises the steps of developing character dot data, which represents characters constructing a designated character string, in memory, generating, character by character, a first characteristic quantity relating to the character in the character dot data of a plurality of characters developed in the memory, generating, character by character, a second characteristic quantity representing a relationship between the character and a character adjacent thereto in the character dot data of the plurality of characters developed in the memory, and inferring an appropriate character spacing character by character by applying the first characteristic quantity and the second characteristic quantity to knowledge relating to character spacing adjustment.

The above-described inferential processing preferably is executed utilizing fuzzy reasoning.

The apparatus and method for adjusting character spacing according to the invention can be applied to a computerized typesetting system, phototypesetting machine or word processor, etc. In these systems or machines, character dot data representing characters constituting a designated character string is developed in memory at a designated character size while the character spacing corresponding to the character spacing obtained is maintained. The characters are printed using the character dot data developed.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
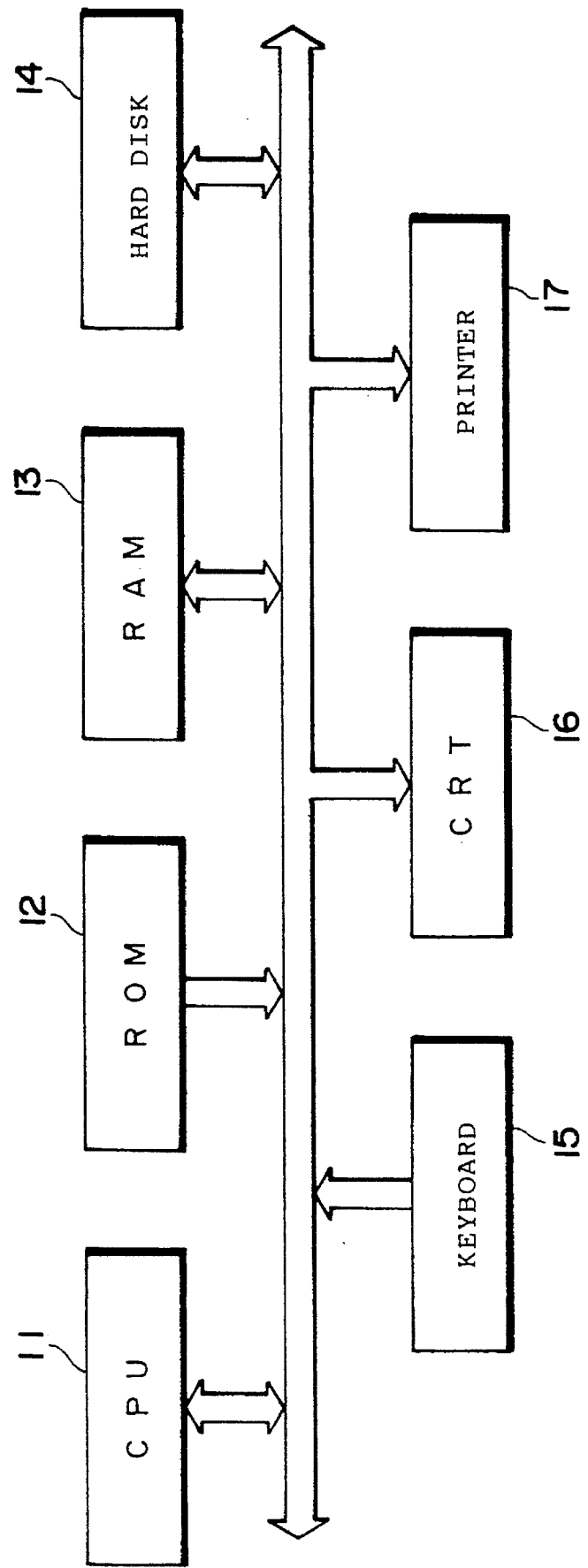
FIG. 1 is a block diagram illustrating the overall electrical configuration of a computerized typesetting system.

FIG. 1 illustrates an overview of the overall configuration of a computerized typesetting system.

The overall operation of the computerized typesetting system is under the control of a CPU 11. As in the case of an ordinary computer system, this computerized typesetting system includes a ROM 12, a RAM 13 and a hard disk drive 14 serving as memory devices, a keyboard 15 serving as an input unit, and a CRT 16 and printer 17 serving as output units.

The ROM 12 generally stores fixed data. The RAM 13 stores variable data and is used as a work area. The hard disk drive 14 is used to store a large quantity of data in a hard disk. A floppy disk drive can be provided instead of or in addition to the hard disk drive 14. For example, programs for controlling the CPU 11, fuzzy reasoning rules and membership functions for character spacing adjustment, described later, are stored in the ROM 12, RAM 13, hard disk or floppy disk. Data representing a document to be printed is stored in the hard disk or floppy disk.

The keyboard 15 is used in order to enter data representing characters constituting a document, as well as various commands. When necessary, devices such as a mouse and light pen are provided as input devices. The CRT 16 displays an entered document, a character string that has undergone a character spacing adjustment, graphics, etc.

In most cases the printer 17 is an electrophotographic printer (a laser printer, etc.). An ink-jet printer or thermal transfer printer also is used as necessary. The results of typesetting are printed by the printer 17. Data constituting characters is stored beforehand in a memory device, which is incorporated in the printer 17, in the form of outline vector fonts or bitmap fonts. The font data may be stored on the hard disk.

The computerized typesetting system possesses a large number of functions, such as a function for entering document data, a function for editing an entered document, a function for adjusting the character spacing in the document, and a function for printing a document that has been edited and adjusted in terms of character spacing. The part of the system that implements the character spacing adjustment function among these functions is a character spacing adjusting apparatus. The computerized typesetting system can be thought of as being an assemblage of devices for implementing these functions.

Figure 2:
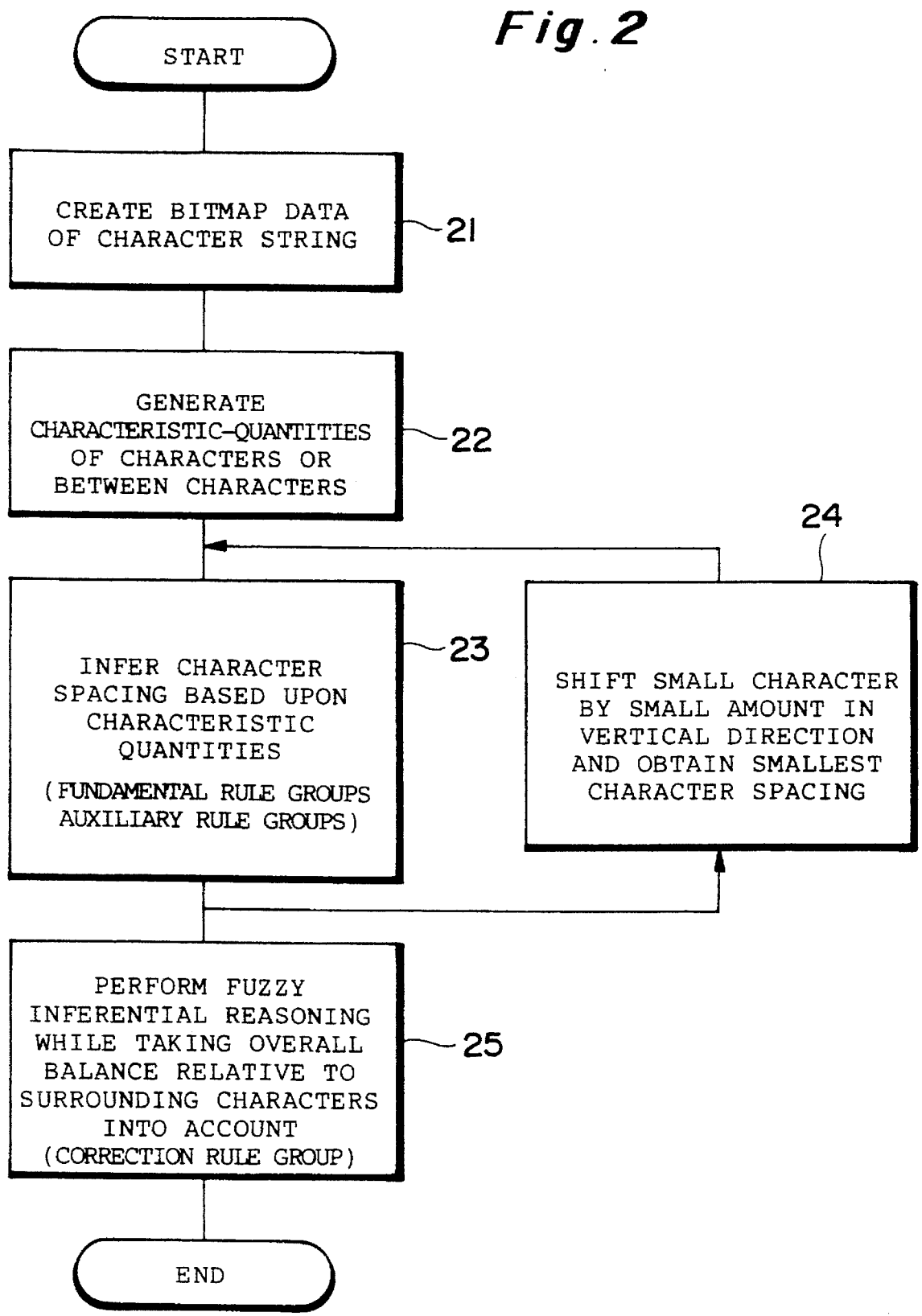
FIG. 2 is a flowchart illustrating the flow of processing for adjusting character spacing.

FIG. 2 illustrates the flow of the operation performed by the character spacing adjusting apparatus in this computerized typesetting system. The series of processing steps illustrated in FIG. 2 is executed mainly under the control of the CPU 11. The apparatus will now be described in accordance with the flow of operation.

Figure 3:
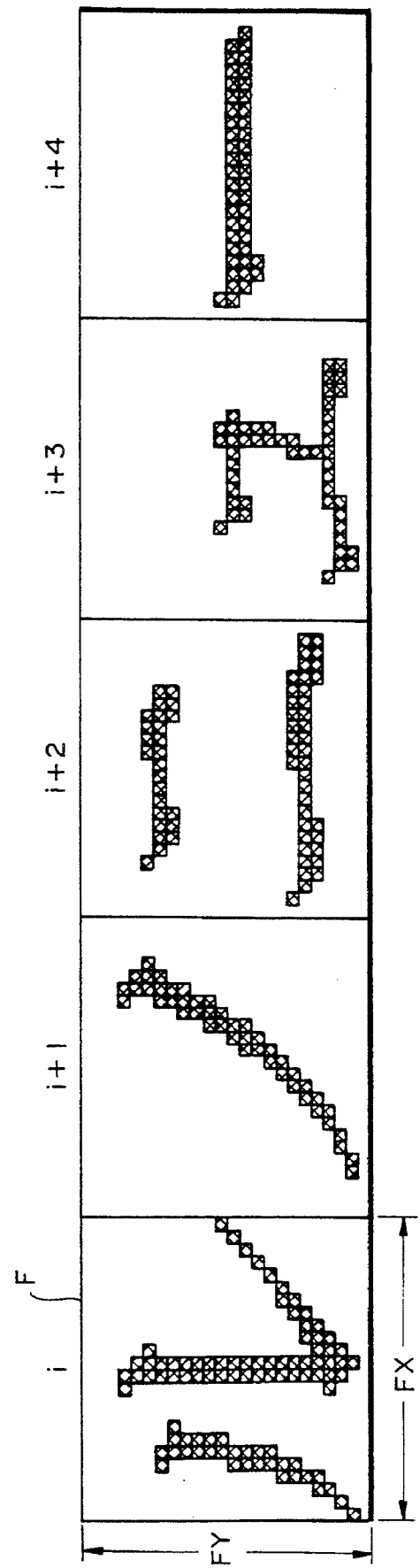
FIG. 3 illustrates a character string developed in a bitmap data.

It will be assumed here that data (a character code string) representing a document to be printed has already been entered and stored on the hard disk. The character code string (e.g., one line or several lines of code) is read out of the hard disk and dot data (bitmap character data) representing the characters designated by the character codes is developed in the work area of the RAM 13 in accordance with font data (step 21). FIG. 3 illustrates an example of the bitmap character data developed.

In general, characters such as kanji, hiragana and katakana in the Japanese language and the Hangul alphabet in the Korean language are arrayed not only horizontally but also vertically in order to construct a sentence. Consequently, a frame (also referred to as a body, imaginary frame or imaginary body) F which is basic to these characters in terms of design is square in shape. The size of the frame F of bitmap character data developed in order to adjust character spacing is decided and fixed in advance. [For example, frame size may be 256×256 dots (pixels).] In FIG. 3, the frame F has a size of 24×24 dots in order to keep the drawing simple. The width of the frame F is indicated by FX, and the height of the frame is indicated by FY (FX=FY in this embodiment).

The characters within the confines of these frames F are represented by dots. For the sake the description, dots constructing the character face shall be referred to as "black dots" and dots representing portions other than the character face shall be referred to as "white dots". As in the case of typical image scanning, a horizontal direction (the lateral direction in FIG. 3) and a vertical direction (the longitudinal direction in FIG. 3) are decided for the bitmap character data.

Five types of characters (Japanese katakana) are arranged horizontally in FIG. 3. Though the present invention is of course applicable also to spacing adjustment of characters arranged in the vertical direction, the description below deals with adjustment of the spacing of characters arranged in the horizontal direction throughout. In the development of the bitmap character data at step 21, a plurality of frames are arranged in a state in which adjacent frames contact each other. These frames (or the characters within them) are assigned the consecutive numbers i, (i+1), (i+2), (i+3) and (i+4).

Characteristic quantities of each character in the character data string developed into a bitmap, as well as characteristic quantities between the characters, are extracted, calculated or generated (step 22).

Characteristic quantities of each character include width $CW(i)$ of the character (character face), height $CH(i)$ of the character (character face), left margin $CSL(i)$ of the character and right margin $CSR(i)$ of the character. Here (i) indicates that the characteristic quantity is that of the character i. The character i (the i-th character) is referred to as the character of interest as necessary.

Figure 4:
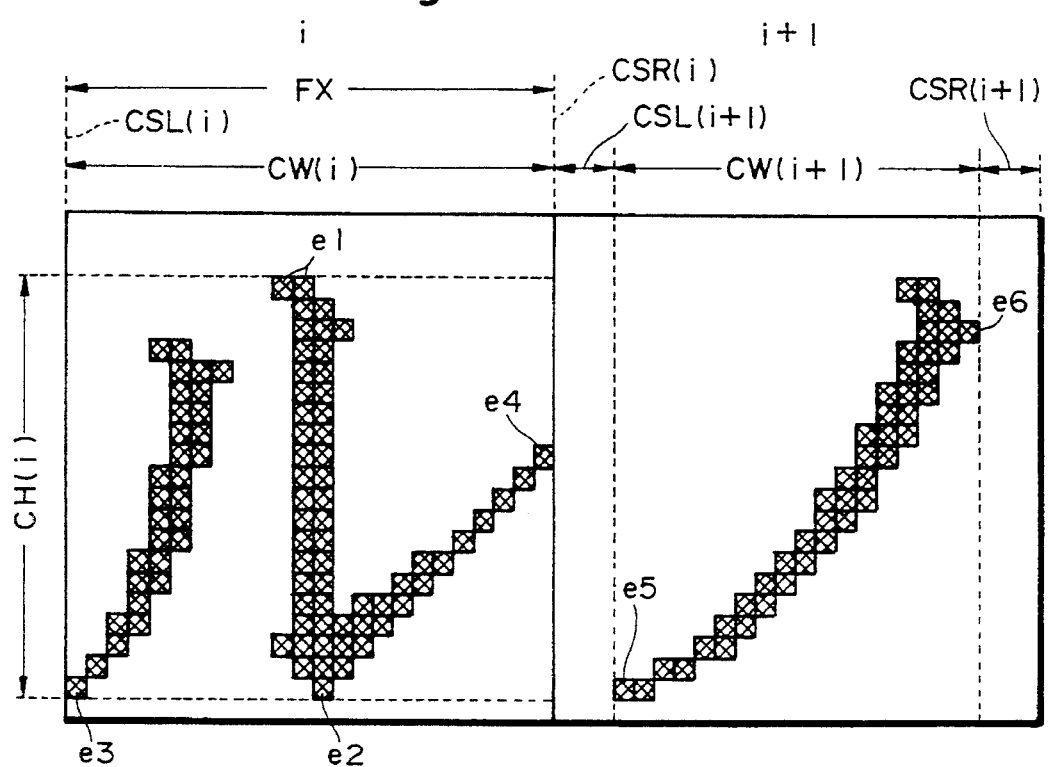
FIG. 4 is for describing characteristic quantities of each character.

FIG. 4 illustrates two characters, in enlarged form, extracted from the bitmap character data string shown in FIG. 3. As shown in FIG. 4, the width CW of each character (character face) is the length between the dot on the left end and the dot on the right end among the black dots constructing the character (character face) (where the length is the number of dots inclusive of the dot on the left end and the dot on the right end). For example, with regard to the i-th character, the width $CW(i)$ of the character is represented by the number of dots from a black dot e3 on the left end to a black dot e4 on the right end [$CW(i)=24$]. Similarly, with regard to the (i+1)th character, the width $CW(i+1)$ of the character is represented by the number of dots from a black dot e5 on the left end to a black dot e6 on the right end (the number of dots includes the dots e5 and e6) [$CW(i+1)=18$].

The height CH of each character (character face) is the length between the dot on the upper end and the dot on the lower end among the black dots constructing the character (character face) (where the length is the number of dots inclusive of the dot on the upper end and the dot on the lower end). For example, with regard to the i-th character, the height $CH(i)$ of the character is represented by the number of dots from a black dot e1 on the upper end to a black dot e2 on the lower end [$CH(i)=20$].

The left margin CSL of each character is represented by the number of dots between the vertical line defining the left side of the character frame and the black dot on the left end of the character face within this character frame (the number of dots does not include the black dot on the left end of the character face). The right margin CSR of each character is represented by the number of dots between the vertical line defining the right side of the character frame and the black dot on the right end of the character face within this character frame (the number of dots does not include the black dot on the right end of the character face). For example, with regard to the i-th character, the black dot e3 on the left end is in contact with the vertical frame line on the left side; hence, CSL(i)=0. Similarly, CSR(i)=0. With regard to the (i+1)th character, we have CSL(i+1)=3, CSR(i+1)=3.

Figure 6:
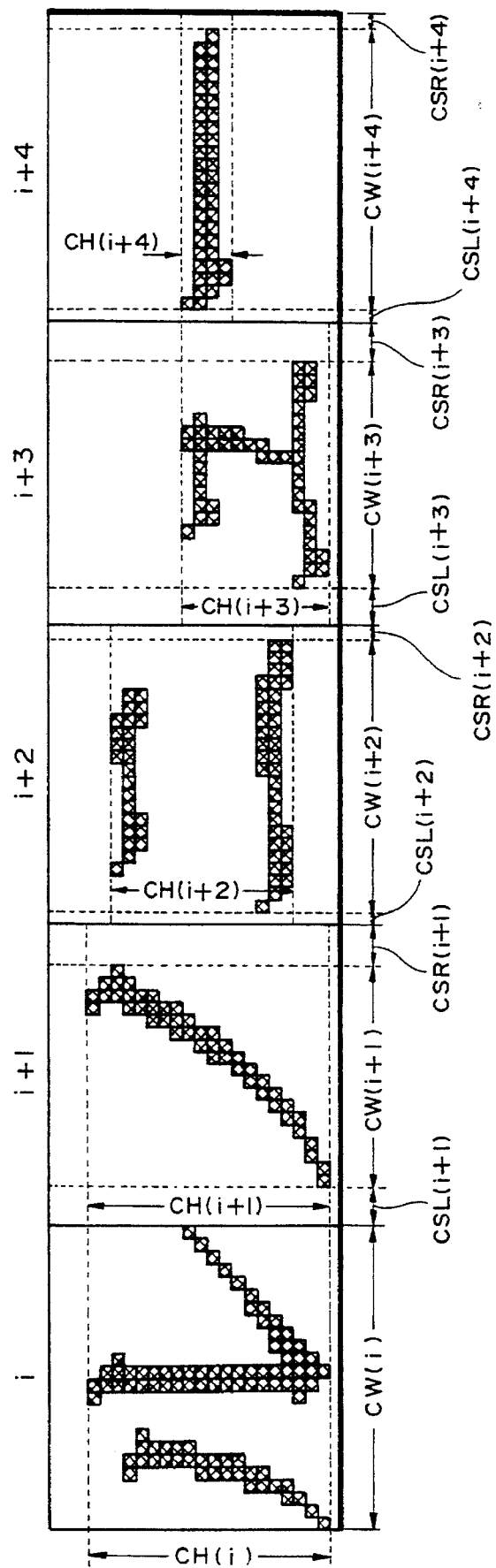
FIG. 6 illustrates the characteristic quantities of the character string shown in FIG. 3.

FIG. 6 illustrates the characteristic quantities CW, CH, CSL and CSR for each of the five characters depicted in FIG. 3.

The basic characteristic quantities of characters and between characters used in order to infer the appropriate character spacing by fuzzy reasoning include character density DS, character face overlap area SB and blank area SW.

Character density DS is a characteristic quantity of a character. This is represented by the number of black dots constructing the character face within one frame. For example, the density DS(i) of the i-th character is 90, and the density DS (i+1) of the (i+1)th character is 45.

The character face overlap area SB and blank area SW are characteristic quantities between a character of interest and the character adjoining it on its right side. The character face overlap area SB(i) and blank area SW(i) regarding the i-th character are generated in the relationship between the i-th character and the (i+1)th character.

Figure 5:
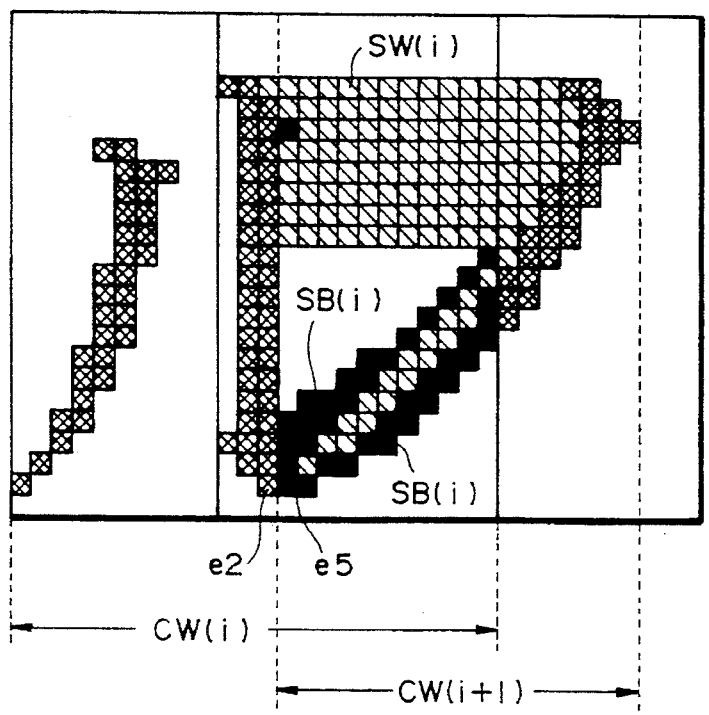
FIG. 5 is for describing characteristic quantities between characters.

As shown in FIG. 5, the (i+1)th character is moved leftward so as to approach the i-th character until part of the character face of the (i+1)th character comes into contact with part of the character face of the i-th character [alternatively, the i-th character may be made to approach the (i+1)th character]. In the example shown in FIG. 5, the black dot e5 on the left end of the (i+1)th character is in contact with the black dot e2 on the lower end of the i-th character. [In general, the left end of the (i+1)th character does not necessarily contact part of the i-th character, and part of the (i+1)th character does not necessarily contact the lower end of the i-th character).

When the i-th character and the (i+1)th character are thus moved in directions to approach each other, the width CW(i) of the i-th character and the width CW(i+1) of the (i+1)th character overlap each other. The sum of the number of black dots of the i-th character and the number of black dots of the (i+1)th character present in the region in which the character widths overlap is the character face overlap area SB(i) of the i-th character.

In FIG. 5, the character face (the black dots) of the i-th character and the character face (the black dots) of the (i+1)th character are indicated by dark (double or crossed) hatching. The character face overlap area SB(i) of these characters is painted in black. According to this example, SB(i)=37. Further, the blank area SW(i) described next is indicated by light (single) hatching. According to this example, we have SW(i)=129.

The blank area SW(i) is the number of white dots bracketed in the horizontal direction by the character face (black dots) of the i-th character and the character face (black dots) of the (i+1)th character in a state in which part of the i-th character and part of the (i+1)th character are in contact with each other.

After these characteristic quantities are found, the proper character spacing is inferred using these characteristic quantities (step 23). In basic fuzzy reasoning and auxiliary fuzzy reasoning, which is described later, it will suffice if the characteristic quantities regarding the character of interest and the character adjoining it are obtained. However, in readjustment (correction) processing described later, the characteristic quantities and character spacing of a plurality of characters in the vicinity of the character of interest are necessary in order to adjust the overall balance of a plurality of characters. Accordingly, it is preferred that calculation of the characteristic quantities be performed with regard to at least one line of characters developed into bitmap character data.

Figure 7:
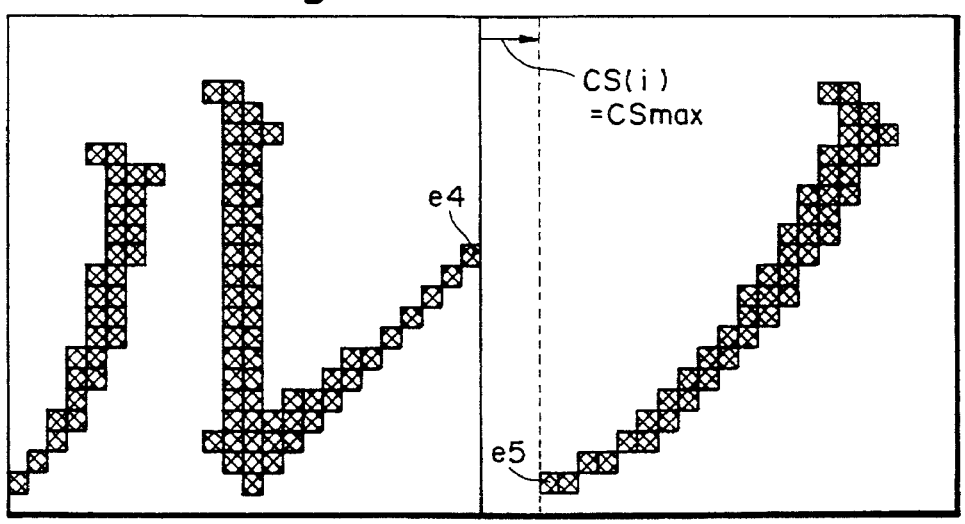
FIG. 7 illustrates maximum character spacing.
Figure 8:
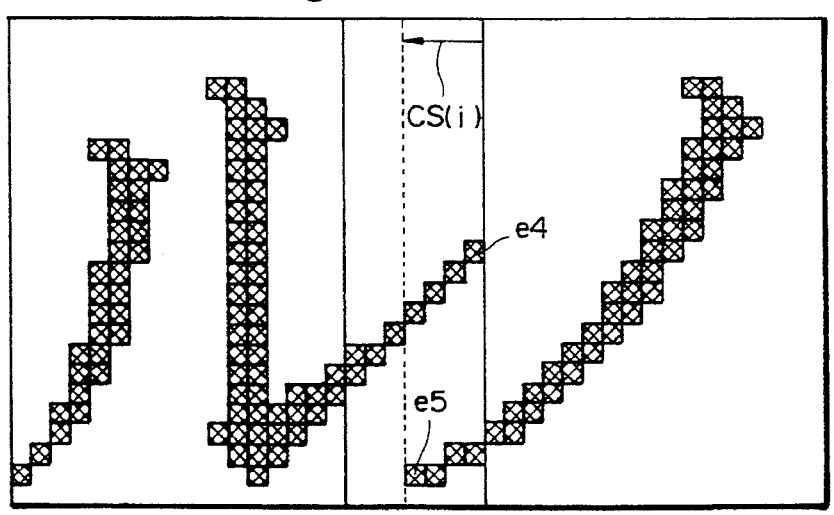
FIG. 8 is for describing character spacing.
Figure 9:
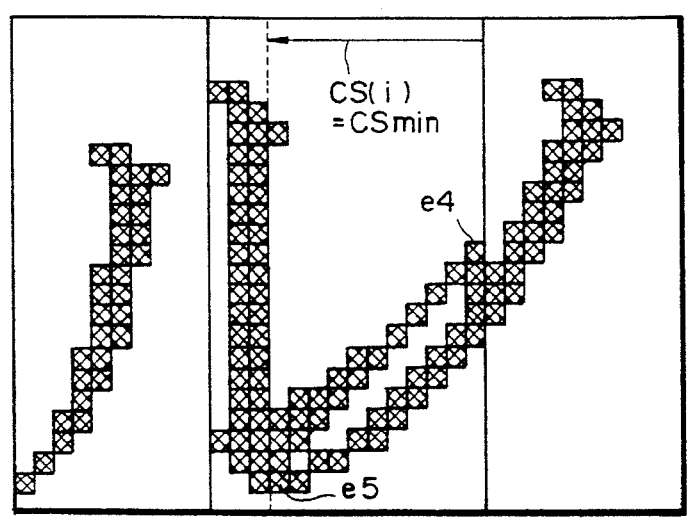
FIG. 9 illustrates minimum character spacing.

Character spacing CS(i) regarding the i-th character obtained by an inferential operation is the distance (number of dots) between a black dot e4 on the right end of the i-th character and a black dot e5 on the left end of the (i+1)th character, as shown in FIGS. 7 through 9.

FIG. 7 illustrates the state of characters developed into bitmap data at step 21. The character spacing at this time is maximum. Let CSmax(i) stand for this maximum character spacing. The character spacing adjustment is performed in a direction that will narrow the spacing between two characters so that the character spacing after adjustment will not be larger than the maximum character spacing. The maximum character spacing CSmax(i) is represented by the sum of the right margin CSR(i) of the i-th character and the left margin CSL(i+1) of the (i+1)th character. That is, $$CSmax(i)=CSR(i)+CSL(i+1) \qquad \text{Eq. (1)}$$

FIG. 8 illustrates a state in which the (i+1)th character has been moved leftward so that parts of the character widths of both characters overlap. When the character widths of adjacent characters thus overlap, the character spacing CS(i) takes on a negative value.

FIG. 9 illustrates a state in which the (i+1)th character has been moved until part of this character contacts part of the i-th character. The character spacing CS(i) takes on a minimum value at this time. Let CSmin(i) stand for the minimum character spacing. The minimum character spacing generally is zero or a negative value.

For the sake of fuzzy reasoning, character spacing degree CSD(i) representing the size of the character spacing between the i-th character and (i+1)th character is defined by the following equations:

$$CSD(i)=[CS(i)-CSmin(i)]/[CSmax(i)-CSmin(i)] \qquad \text{Eq. (2)}$$

$$CSmin(i) \leq CS(i) < CSmax(i) \qquad \text{Eq. (3)}$$

The character spacing degree CSD(i) takes on continuous values between 0 and 1.

The character spacing degree CSD(i) is found in fuzzy reasoning, which is illustrated next, and the character spacing CS(i) is finally obtained in accordance with Equation (2).

Fuzzy reasoning basically is carried out using character density DS(i), character face overlap area SB(i) and blank area SW(i) as antecedent variables. The consequent is the character spacing degree CSD(i).

Examples of groups of fundamental rules are as follows:

(I) Group of rules relating to character density DS

IF DS(i) is large AND DS(i+1) is large, THEN CSD(i) is large.

IF DS(i) is medium AND DS(i+1) is medium, THEN CSD(i) is medium.

IF DS(i) is small AND DS(i+1) is small, THEN CSD(i) is small.

In a character having a large density, the number of black dots is large. Accordingly, in a case where two such characters are arranged side by side, they will be difficult to read if the character spacing is made small. This means that the character spacing is enlarged to facilitate reading. Conversely, when characters having a small density are arranged side by side, these characters are easier read if they are close together.

(II) Group of rules relating to character face overlap area SB

IF SB(i) is large, THEN CSD(i) is large.
IF SB(i) is medium, THEN CSD(i) is medium.
IF SB(i) is small, THEN CSD(i) is small.

In case of a large character face overlap area, widening the character spacing facilitates reading. If the character face overlap are is small, then reading is made easier by making the character spacing small.

(III) Group of rules relating to character blank area SW
IF SW(i) is large, THEN CSD(i) is small.
IF SW(i) is medium, THEN CSD(i) is medium.
IF SW(i) is small, THEN CSD(i) is large.

Since character spacing appears large when the blank area is large, reducing the character spacing makes reading the characters easier. Conversely, when the blank area is small, reading is facilitated by widening the character spacing, just as in the case where the character overlap area is large.

Figure 10:
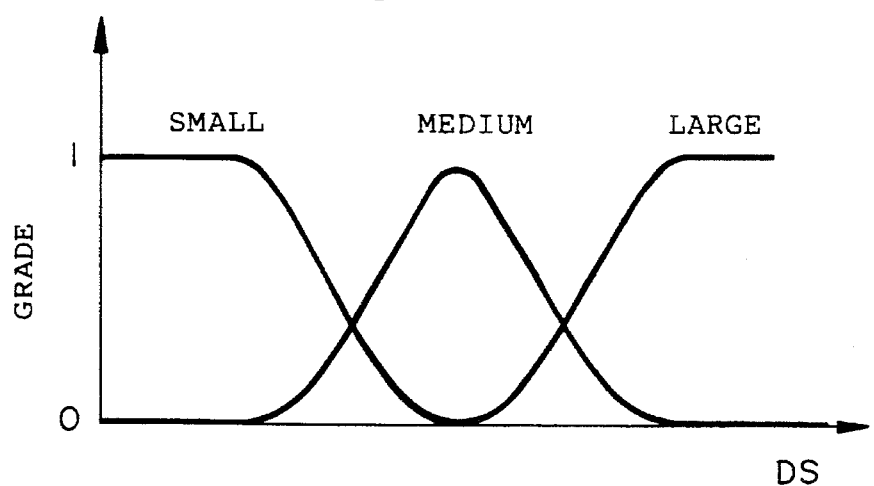
FIG. 10 is a graph illustrating examples of membership functions relating to character density DS.
Figure 11:
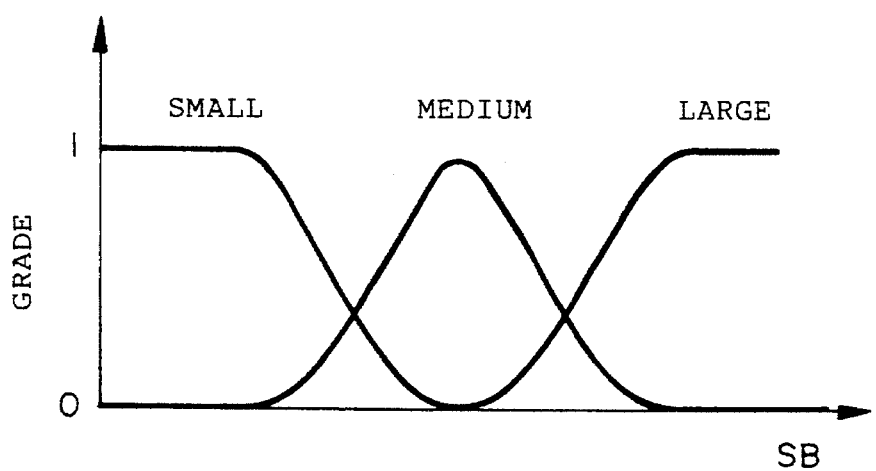
FIG. 11 is a graph illustrating examples of membership functions relating to overlapping characterface area SB.
Figure 12:
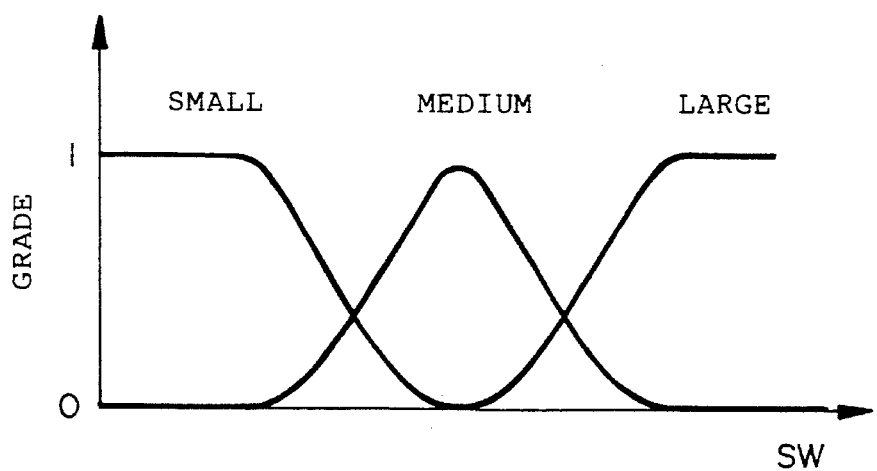
FIG. 12 is a graph illustrating examples of membership functions relating to blank area SW.

FIGS. 10 through 12 illustrate examples of antecedent membership functions used in these groups of basic rules. FIG. 10 illustrates membership functions relating to character density, FIG. 11 membership functions relating to character face overlap area, and FIG. 12 membership functions relating to blank space area.

Figure 13:
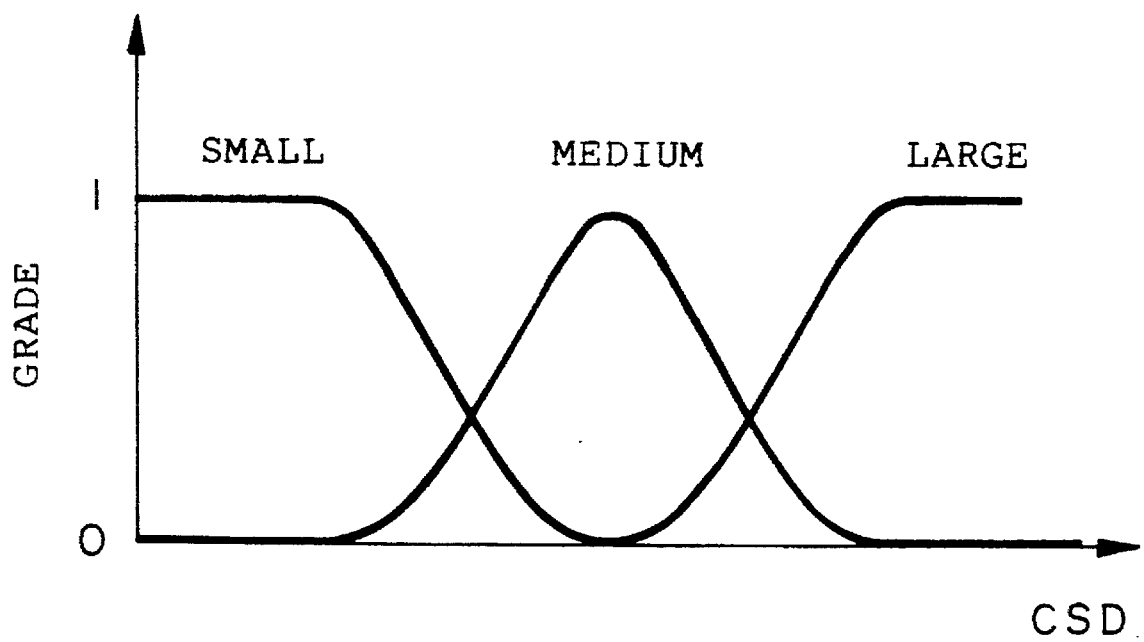
FIG. 13 is a graph illustrating examples of membership functions relating to character spacing degree CSD.

FIG. 13 illustrates membership functions relating to the character spacing degree CSD of the consequent.

It will suffice if fuzzy reasoning using the above-mentioned groups of rules and membership functions is carried out in accordance with an inferential operational method already established. For example, the consequent membership function is truncated by the obtained degree of membership (grade) of the antecedent rule by rule. A MAX operation of truncated consequent membership functions for all rules is performed. The center of gravity of the results of the MAX operation is found. The center of gravity obtained is the final character spacing degree. The character spacing is obtained by substituting this character spacing degree in Equation (2).

In the above-described rule groups and FIGS. 10 through 13, three types of membership functions "small", "medium" and "large" are illustrated with regard to each variable. However, it goes without saying that membership functions representing linguistic information such as "somewhat small" and "somewhat large" may be added as needed.

Further, though there is one type of antecedent variable in each group of rules described above, it is possible to create rules in which variables of two or more types are adopted as antecedents. For example, it is possible to create the following rule:

IF DS(i) is large AND SB(i) is large AND SW(i) is small, THEN CSD(i) is very large.

Any combination of character density DS, character face overlap area SB and blank area SW can be described in an antecedent.

The above-described inferential operation for obtaining character spacing is executed successively with regard to all characters contained in a given character string. The proper character spacings for all characters are eventually obtained.

The fundamental groups (I), (II) and (III) relate to the minimum necessary antecedent variables DS, SB and SW required in order to infer the proper character spacing. Auxiliary antecedent variables can be used as needed.

These auxiliary antecedent variables include user input spacing UCS, a variable KS concerning the ratio of minimum character spacing to character face width, a variable KH concerning the ratio of minimum character spacing to character height, character overlap complexity CPS, etc. These auxiliary variables will now be described.

User input spacing UCS is character spacing designated by the user with regard to a specific character. The user is capable of entering a desired character spacing by designating a specific character using the keyboard 15. For example, the character spacing would be entered in the form of the number of dots, in the form of a ratio with respect to the character spacing of a specific character displayed on the CRT 16, or by some other method. Examples of rules relating to user input spacing are as follows:

(IV) Group of rules relating to user input spacing UCS
IF UCS(i) is large, THEN CSD(i) is large.
IF UCS(i) is medium, THEN CSD(i) is medium.
IF UCS(i) is small, THEN CSD(i) is small.

If the user wishes to enlarge the character spacing, then the character spacing is enlarged accordingly. If the user desires a small character spacing, then the character spacing is reduced.

Figure 14:
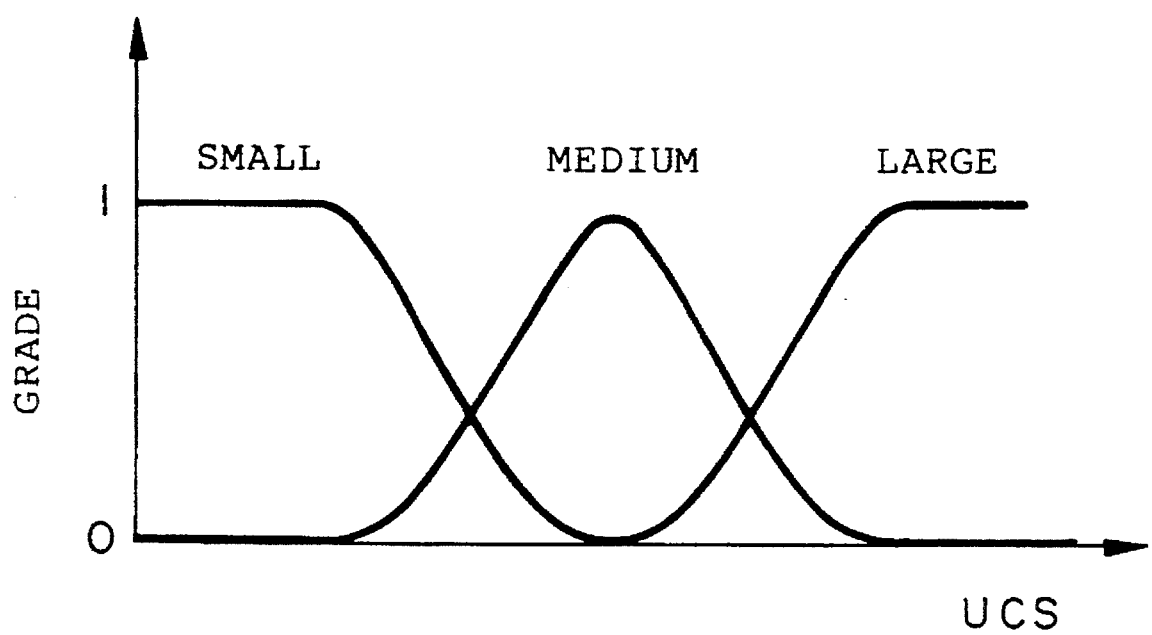
FIG. 14 is a graph illustrating examples of membership functions relating to user input spacing UCS.

FIG. 14 illustrates an example of membership functions relating to user input spacing UCS. It goes without saying that membership functions (e.g., "very large") of many types can be set as needed.

In inferential reasoning that takes the user input spacing into account (step 23), the above-described rule group (IV) relating to UCS is set as a rule group for fuzzy reasoning in addition to the fundamental rule groups (I), (II) and (III). Inferential operations in accordance with all of these rule groups are executed to finally obtain the optimum character spacing that also takes the user input spacing into consideration.

It goes without saying that it is possible to create rule groups in which any combination of DS, SB, SW and UCS is adopted as an antecedent.

The variable KS(i) is defined by the following equation:

$$KS(i) = |CSmin(i)|/MIN[CW(i), CW(i+1)] \qquad \text{Eq. (4)}$$

where MIN[CW(i),CW(i+1)] means that the smaller of CW(i) and CW(i+1) is selected for use.

An example of a rule relating to the variable KS is as follows:

(V) Rule (group) relating to variable KS
IF KS(i) is large, THEN CSD(i) is large.

Figure 15:
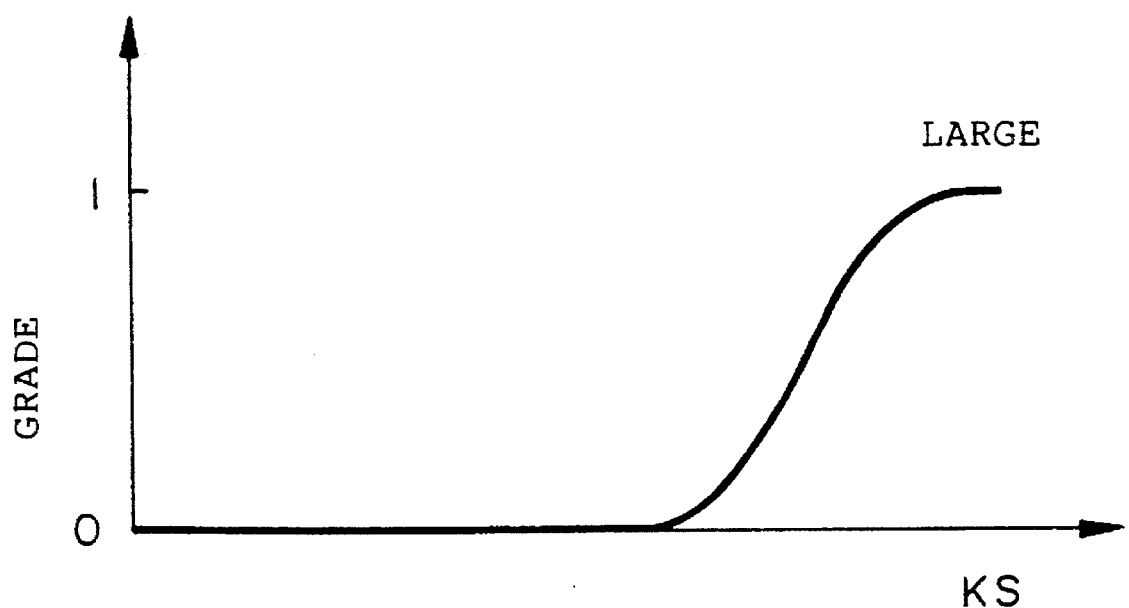
FIG. 15 is a graph illustrating an example of a membership function relating to a variable KS.

FIG. 15 illustrates an example of a membership function relating to the variable KS. Here the membership function has been defined solely with regard to the linguistic information "large". Accordingly, the above-mentioned rule has absolutely no influence in a region within which the membership function "large" has not been defined (i.e., in an area in which the grade is zero). Of course, it goes without saying that membership functions of two or more types can be created as needed and that many rules in addition to that cited above can be set.

The minimum character spacing CSmin indicates the maximum extent to which the i-th character and (i+1)th character are capable of overlapping. If the character spacing obtained by the above-mentioned fundamental rule groups (I), (II) and (III) is such that i-th character and (i+1)th character overlap to a considerable degree, there is the possibility that the characters will be difficult to read. In particular, in a case where one of two characters has a narrow character width CH, an impression may be given that one character is dependent upon the other character. In a case where the absolute value of the minimum character spacing CSmin is fairly large or the smaller character width of two characters is fairly small, the variable KS will become fairly large in accordance with Equation (4). In such case the character spacing is enlarged by Rule (V). Rule (V) is for the purpose of correcting character spacing made too narrow by the fundamental rule groups.

The fuzzy reasoning (step 23) for inferring character spacing is performed in accordance with rule groups constructed by adding the rule (group) (V) to the fundamental rule groups (I), (II) and (III). The appropriate character spacing that also takes the variable KS into account is obtained as a result. The characteristic quantity MIN[CH(i), CH(i+1)] is calculated before inferential reasoning (step 22). It goes without saying that it is possible to set rules in which any combination of DS, SB, SW and KS is placed in the antecedent.

An arrangement may be adopted in which fuzzy reasoning is carried out in accordance with a rule group composed of all of the rule groups (I), (II), (III), (IV) and (V). In this case the user input spacing UCS and the variable KS are taken into account in the inference of character spacing. Of course, a rule in which any combination of DS, SB, SW, UCS and KS is placed in the antecedent may be set.

The variable KH(i) is defined by the following equation:

$$KH(i)=|CSmin(i)|/MIN[CH(i),CH(i+1)] \qquad \text{Eq. (5)}$$

An example of a rule relating to the variable KH(i) is as follows:

(VI) Rule (group) relating to variable KH
  IF KH(i) is large, THEN CSD(i) is large.

Figure 16:
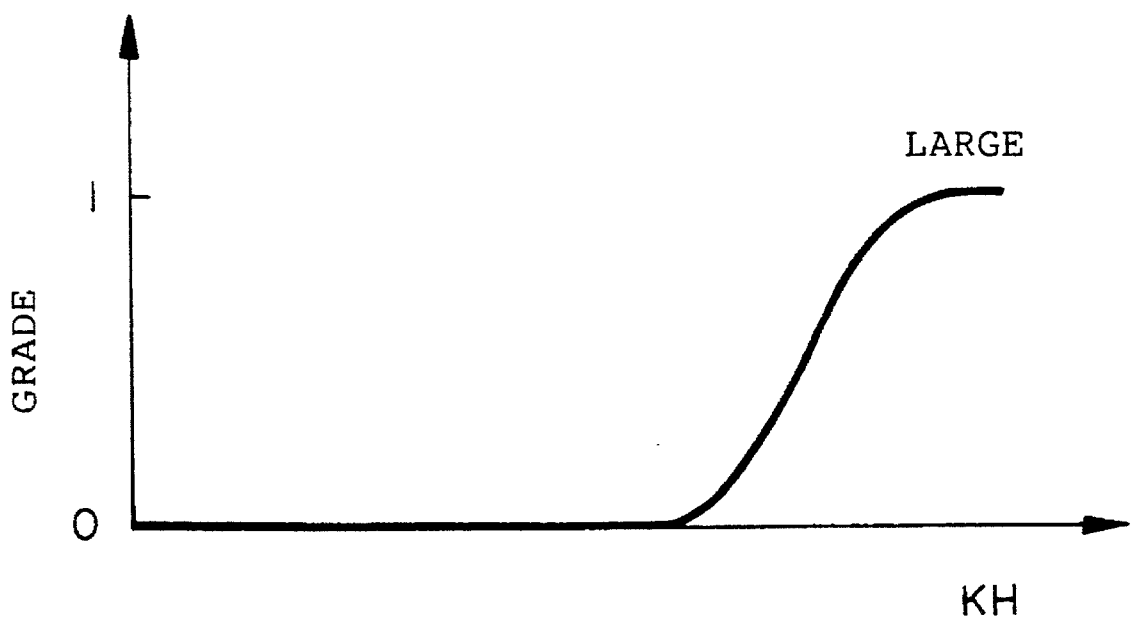
FIG. 16 is a graph illustrating an example of a membership function relating to a variable KH.

FIG. 16 illustrates an example of a membership function relating to the variable KH. This membership function also is such that the grade is zero in an area in which the value of KH is small. Within this area the above-mentioned rule has absolutely no influence upon overall inferential reasoning. Of course, it goes without saying that two or more types of membership functions can be created in relation to KH and that rules other than those mentioned above can be set.

In a case where the character height CH of either the i-th character or (i+1)th character is small, the impression will be given that the character of small height is dependent upon the other character if the two characters overlap to a considerable degree. Rule (VI) is for the purpose of preventing this result from being produced by the fundamental rule groups (I)~(III). Rule (VI) also acts to correct the results of inferential reasoning based upon the fundamental rule groups.

For this reason the membership functions relating to the variables KS and KH are defined solely with regard to the regions within which the values of these variables are large (see FIGS. 15 and 16).

The fuzzy reasoning (step 23) for inferring character spacing is carried out in accordance with rule groups constructed by adding the Rule (VI) to the fundamental rule groups (I), (II) and (III). The appropriate character spacing that also takes the variable KH into account is obtained as a result. The characteristic quantity MIN[CH(i),CH(i+1)] is calculated before inferential reasoning (step 22). It goes without saying that it is possible to set rules in which any combination of DS, SB, SW and KH is placed in the antecedent.

An arrangement may be adopted in which fuzzy reasoning is carried out in accordance with a rule group composed of all of the rule groups (I), (II), (III), (IV), (V) and (VI). However, the fundamental rule groups (I), (II) and (III) are always used. One, two or more of the rule groups (IV), (V) and (VI) is (are) added to the fundamental rule groups. In this case, a rule in which any combination of DS, SB, SW, UCS, KS and KH is placed in the antecedent may be set.

The character overlap complexity CPX(i) is the average value of the number of times a vertical scanning line for every dot (pixel) is shifted from the character face of the first character to the character face of the second character or from the character face of the second character to the character face of the first character in an overlap region [a region in which the width of the i-th character and the width of the (i+1)th character overlap each other] formed by bringing the i-th character and (i+1)th character closer together until parts of these characters contact each other.

Figure 17:
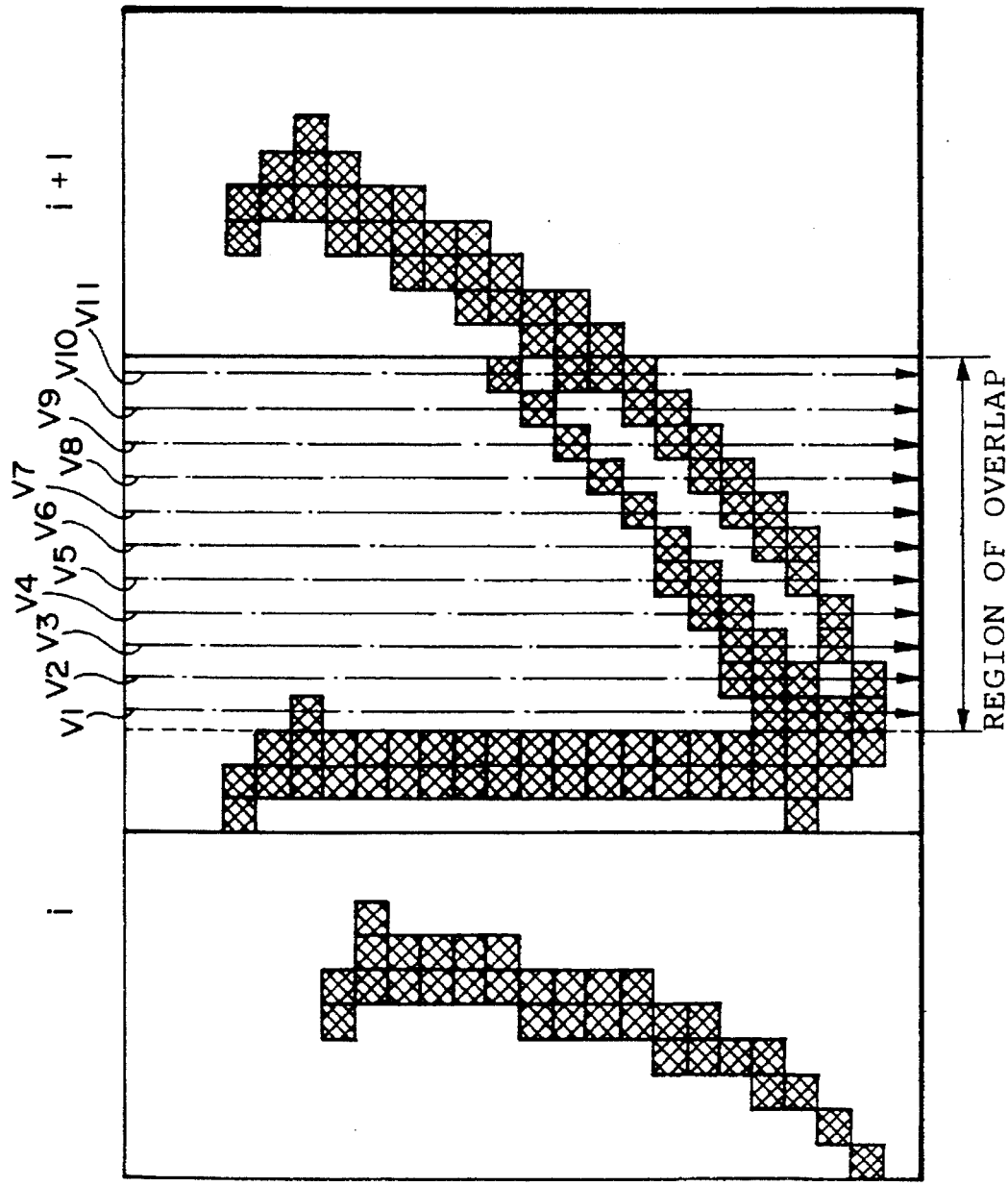
FIG. 17 is for describing degree of character overlap complexity.

This will be described in detail with reference to FIG. 17. There are 11 vertical scanning lines V1~V11 in the overlap region of the i-th character and (i+1)th character. These vertical scanning lines are all shifted one time from the character face of the i-th character to the character face of the (i+1)th character. Accordingly, the average value also is one and the character overlap complexity CPX is one.

Figure 18:
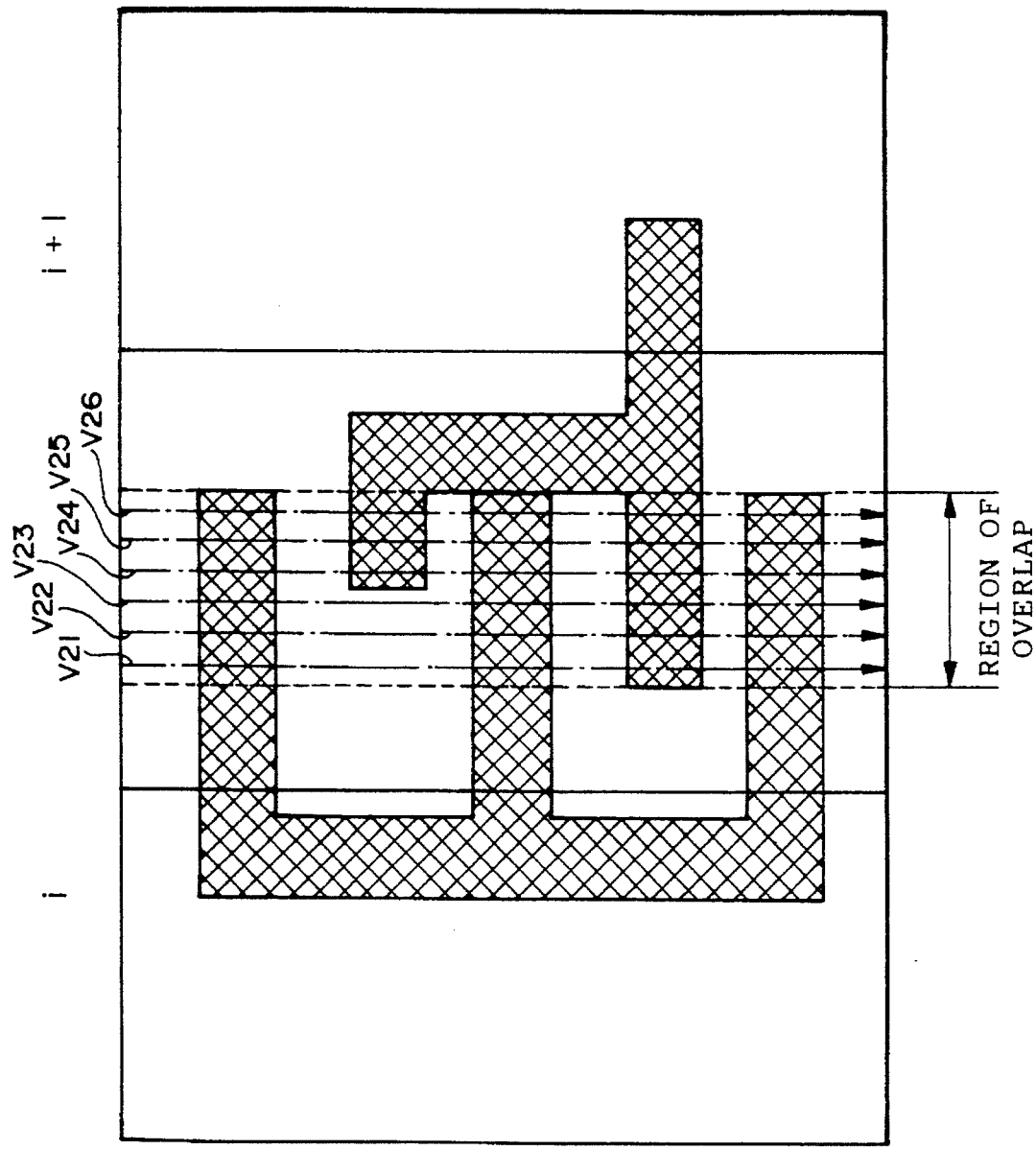
FIG. 18 is for describing degree of character overlap complexity.

In an example shown in FIG. 18, there are six vertical scanning lines in the overlap region of the i-th character and (i+1)th character. Vertical scanning lines V21~V23 among these are shifted from the character face of the i-th character to the character face of the (i+1)th character and further from the character face of the (i+1)th character to the character face of the i-th character. Accordingly, the number of shifts is two each. On the other hand, the number of shifts of scanning lines V24~V26 is four. Accordingly, the character overlap complexity is calculated in accordance with the following equation:

$$CPX(i)=(2+2+2+4+4+4)/6=3 \qquad \text{Eq. (6)}$$

The character overlap complexity CPX(i) is calculated at the processing step (step 22) for generating the characteristic quantities.

A group of rules relating to the character overlap complexity CPX is as follows, by way of example:

(VII) Rule group relating to character overlap complexity CPX
  IF CPX(i) is large, THEN CSD(i) is large.
  IF CPX(i) is medium, THEN CSD(i) is medium.
  IF CPX(i) is small, THEN CSD(i) is small.

Figure 19:
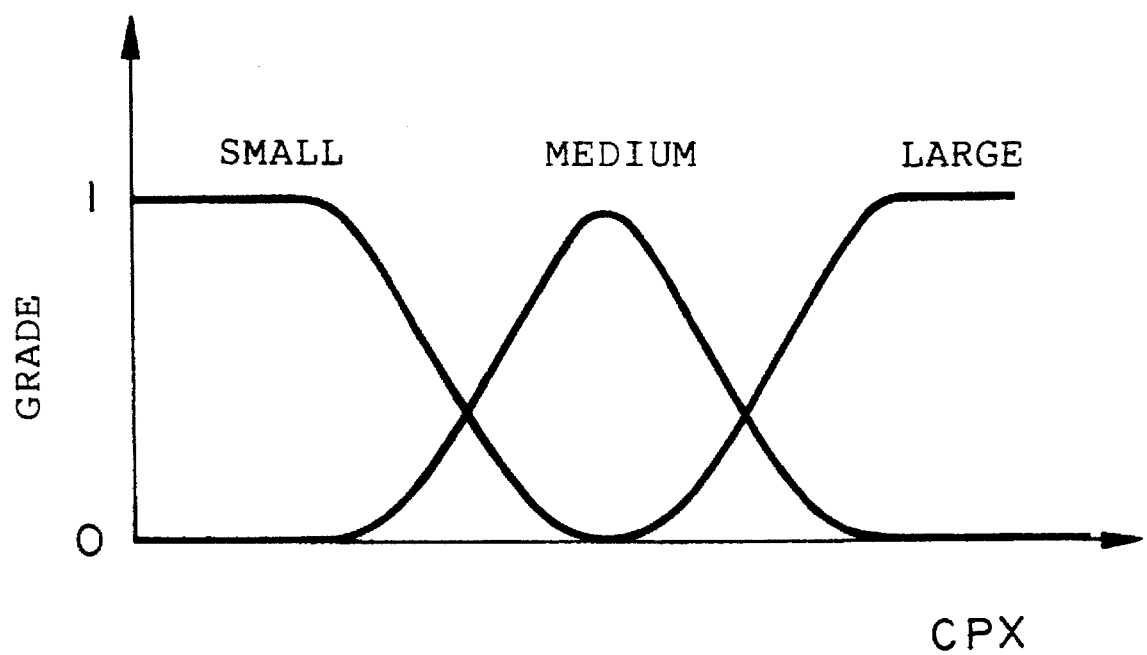
FIG. 19 is a graph illustrating examples of membership functions relating to degree of character overlap complexity.

FIG. 19 illustrates an example of membership functions relating to character overlap complexity CPX.

A large character overlap complexity means that if two characters are brought close to each other, parts of the characters will overlap to a considerable degree and make it difficult to read the characters. In such case, therefore, reading is facilitated by enlarging the character spacing. If the character overlap complexity is small, then no problems arise if the character spacing is reduced.

The fuzzy reasoning (step 23) for inferring character spacing that takes character overlap complexity CPX into account is carried out in accordance with rule groups constructed by adding the Rule (VII) to the fundamental rule groups (I), (II) and (III). It goes without saying that it is possible to set rules in which any combination of DS, SB, SW and CPX is placed in the antecedent.

An arrangement may be adopted in which fuzzy reasoning is executed in accordance with rule groups constructed in accordance with any combination of all of the above-mentioned rule groups (I), (II), (III), (IV), (V), (VI) and (VII) [the rule groups (I), (II) and (III), however, are always included]. That is, one, two or more of the auxiliary rule groups (IV), (V), (VI) and (VII) is (are) added onto the fundamental rule groups (I), (II) and (III). In this case, rules in which any combination of DS, SB, SW, UCS, KS, KH and CPX is placed in the antecedent may be created.

Figure 20:
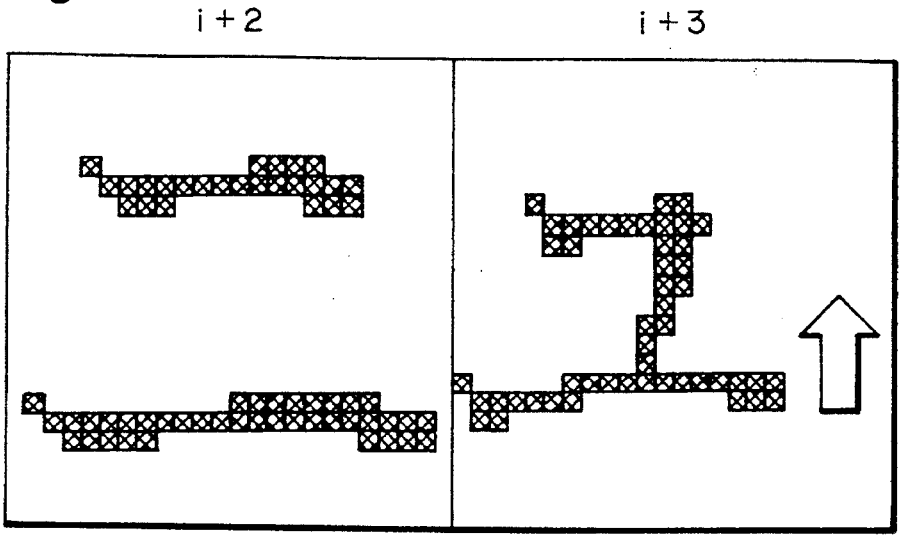
FIG. 20 illustrates an (i+3)th character shifted upward by four dots.
Figure 21:
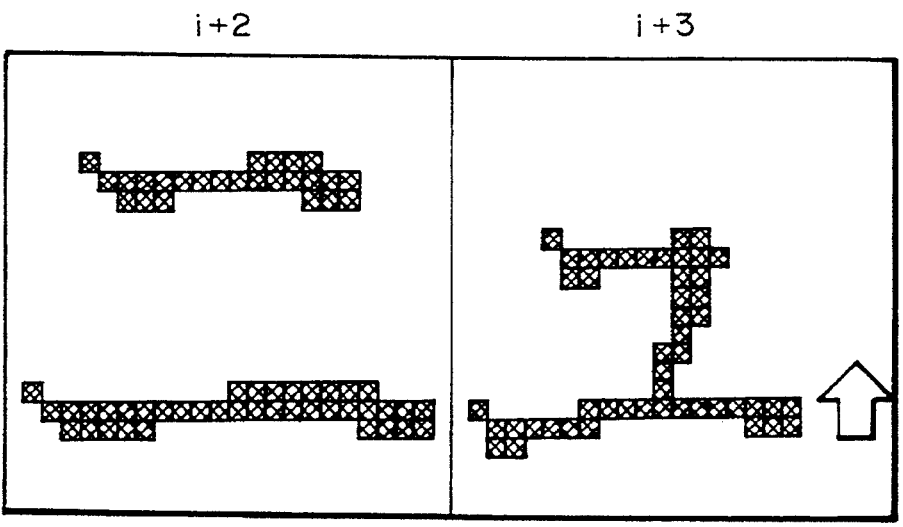
FIG. 21 illustrates the (i+3)th character shifted upward by two dots.
Figure 22:
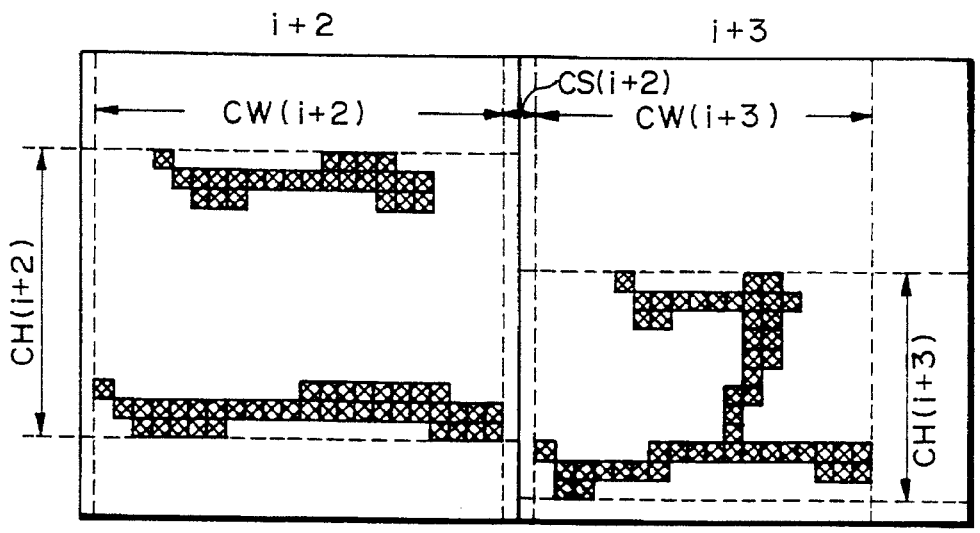
FIG. 22 shows characters in a state developed in a bitmap data.
Figure 23:
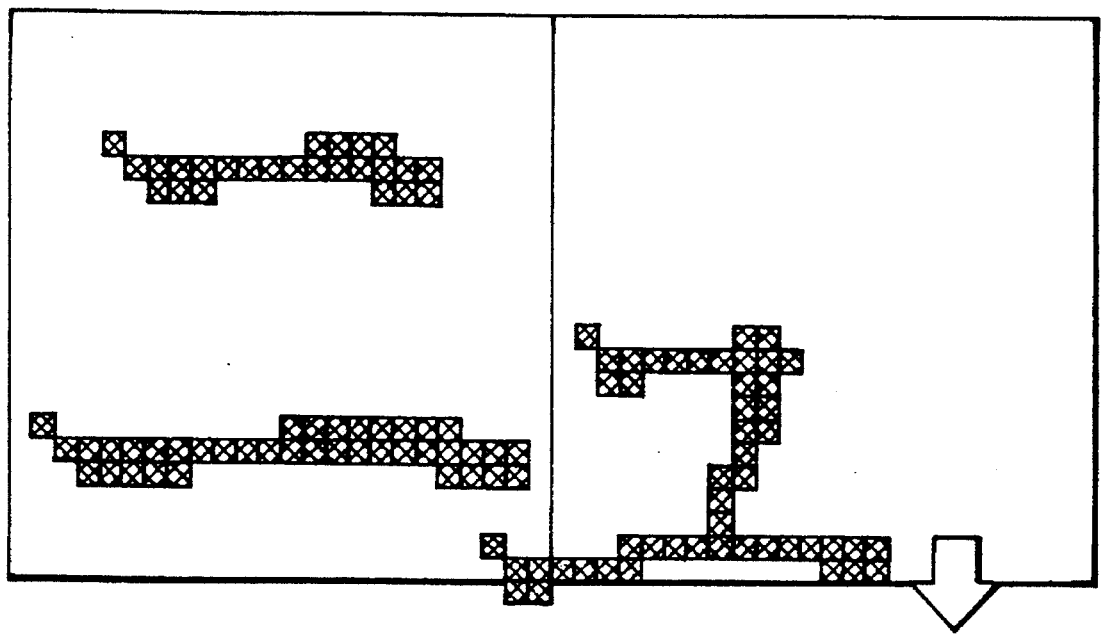
FIG. 23 illustrates the (i+3)th character shifted downward by two dots.
Figure 24:
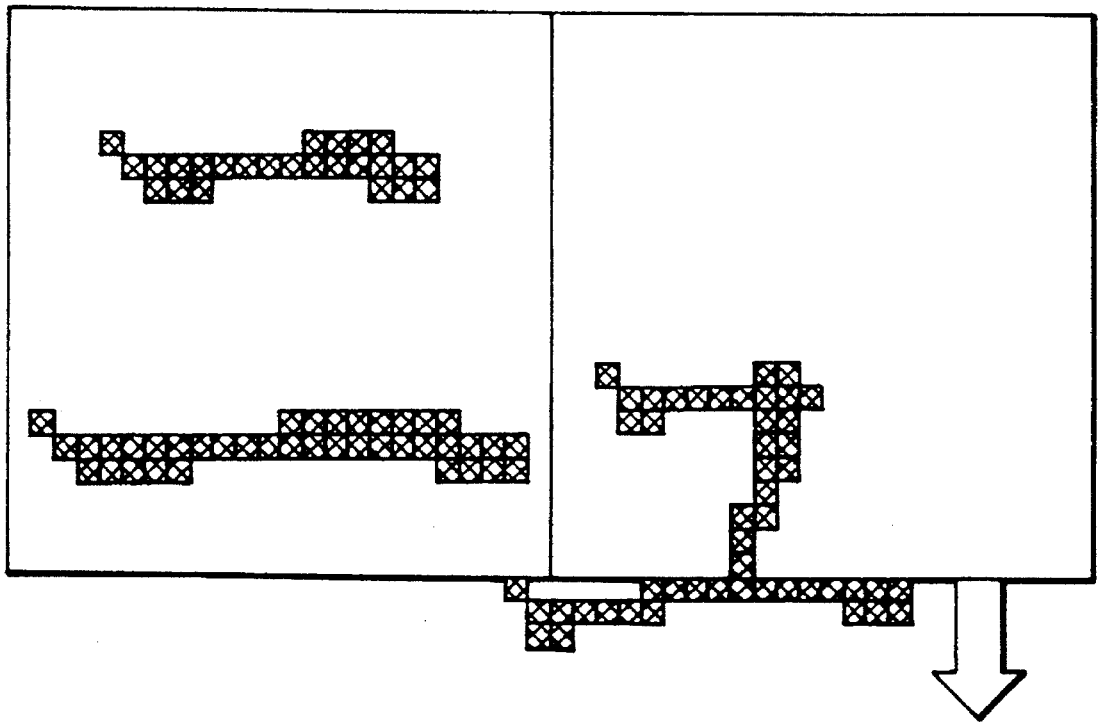
FIG. 24 illustrates the (i+3)th character shifted downward by four dots.

The treatment of small characters will now be described. The term "small character" refers to a character whose height CH and width CW both are small in comparison with other characters, as in the manner of the (1+3)th character in FIG. 3 or 6. In a case where the decision as to whether a character is a small character is made by the CPU 11, reference values for making this decision (e.g., the number of bits of the upper-limit value of height and the number of bits of the upper-limit value of width or the ratios of those with respect to the frame) are stored in the RAM 13 beforehand or entered by the user. Bits (or a code) indicating that a character is small may be added onto the code of a small character in the character code string stored in the hard disk 14. An arrangement may be adopted in which the user is allowed to designate on the display screen the fact that a character is a small character. In any case, if a character is a small character, the following processing is executed in terms of the relationship with the character [the (i+2)th character in FIG. 3 or 6] preceding this character:

FIGS. 20 through 24 illustrate the (i+2)th character and the (i+3)th character. FIG. 22 shows the bitmap data developed at step 21. FIG. 21 depicts a state in which the entire character face of the small (i+3)th character has been shifted upward by two dots as compared with FIG. 22. FIG. 20 depicts a state in which the entire character face of the small (i+3)th character has been shifted upward by four dots from the state shown in FIG. 22. Furthermore, FIGS. 23 and 24 illustrate the character face of the small (i+3)th character shifted downward by two dots and four dots, respectively, from the state of FIG. 22.

Thus, when there is a small character, the appropriate character spacing is inferred in a state in which the small character (i+3) is maintained at the height position at which it was developed in bitmap form in the inference of the character spacing CS(i+2) regarding the character (i+2) immediately preceding the small character (i+3), the small character (i+3) is shifted upward or downward a suitable amount, and the appropriate character spacing of the character (i+2) is inferred with regard to the small character at this shifted position. In these inferential operations, use is made of the above-described fundamental rule groups (and the necessary auxiliary rule groups). The smallest character spacing is then selected from among the appropriate character spacings for the various height positions of the small character (i+3) thus obtained (step 24). The height position of the small character that gives rise to the smallest character spacing is decided as being the height of this character. In the examples of FIGS. 20 through 24, the character spacing CS(i+2) in FIG. 23 is the smallest. In FIG. 23, the fact that part of the black dot of the (i+3)th character protrudes from below the frame is not a problem. Since making the spacing between the two characters as small as possible is the purpose of the character spacing adjustment, the minimum character spacing is selected. Though the small character (i+3) is shifted up or down in two-dot increments in FIGS. 20 through 24, any amount of shift can be set.

Generally speaking, a small character in the Japanese language is attached to the character that precedes it. In the examples described above, the spacing between a small character and the character that precedes it is decided so as to become as small as possible utilizing this quality of the Japanese language. In languages whose nature is such that a small character is attached to the character that follows it, the character spacing between the small character and the character arranged after it is adjusted so as to become as small as possible.

Thus, as set forth above, the appropriate character spacing regarding all characters, or at least one line of characters, constructing a sentence represented by a character code sequence is found by fuzzy inferential reasoning. Thereafter, processing for correcting (readjusting) the character spacing of a character of interest while taking into account the overall balance of a plurality of other characters arrayed before or after the character of interest is executed (step 25). This correction processing is carried out with regard to all characters taking all of these characters as characters of interest.

Fuzzy reasoning is used in the correction 0 processing as well. Specifically, CI(i) representing two characters of width inclusive of the character of interest and CL(i) representing four characters of width inclusive of the character of interest are used as the variables of the antecedent in an inferential rule. These variables are defined by the following equations:

$$CI(i)=CW(i)+CS(i)+CW(i+1) \qquad \text{Eq. (7)}$$

$$CL(i)=CW(i-1)+CS(i-1)+CW(i)+CS(i)+ \\ CW(i+1)+CS(i+1)+CW(i+2) \qquad \text{Eq. (8)}$$

CW(i−1), CW(i), CW(i+1) and CW(i+2) in these Equations are the widths of the (i−1)th, i-th, (i+1)th and (i+2)th characters, respectively. Further, CS(i−1), CS(i) and CS(i+1) are the appropriate character spacings of the (i−1)th, i-th and (i+1)th characters, respectively, already found through fuzzy reasoning.

The consequent of the fuzzy inferential rule is the corrective quantity ΔCS(i) of the character spacing CS(i). When this corrective quantity is obtained in fuzzy reasoning, the final optimum character spacing is decided as being SC(i)+ΔCS(i).

An example of a rule group for character spacing correction is as follows:

(VIII) Rule group for character spacing correction
IF CI(i) is small, THEN ΔCS(i) is somewhat large
IF CL(i) is small, THEN ΔCS(i) is large.

Figure 25:
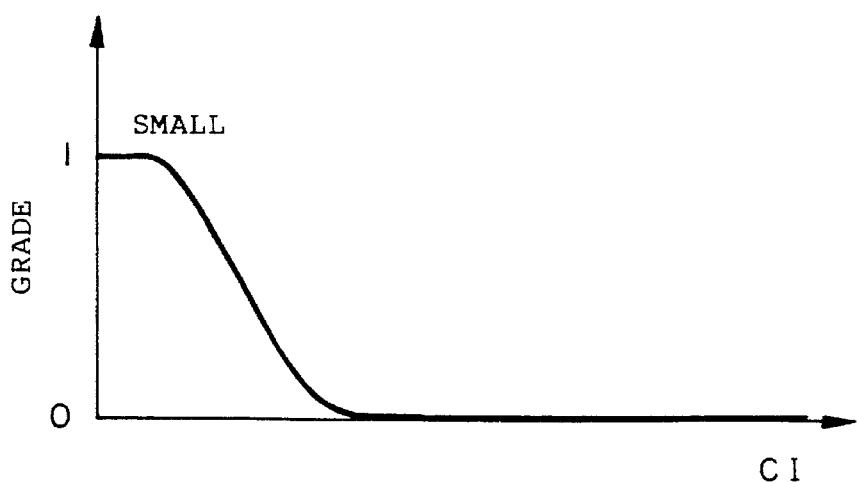
FIG. 25 is a graph illustrating an example of a membership function relating to a variable CI representing two characters of width.
Figure 26:
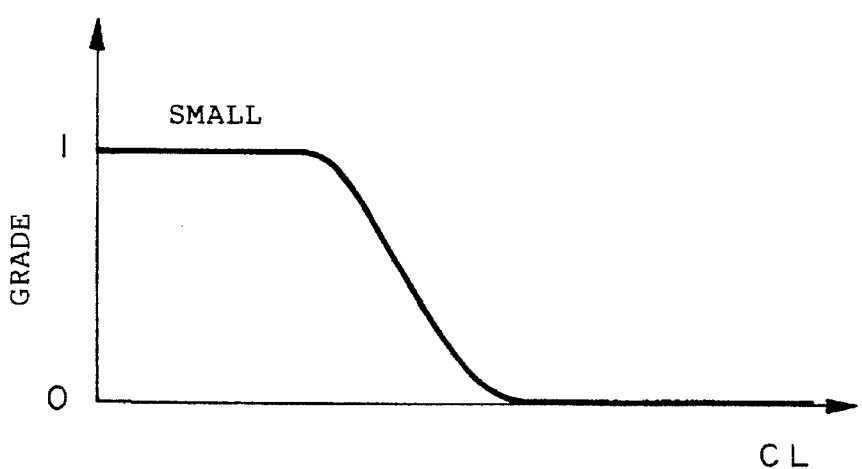
FIG. 26 is a graph illustrating an example of a membership function relating to a variable CL representing four characters of width.
Figure 27:
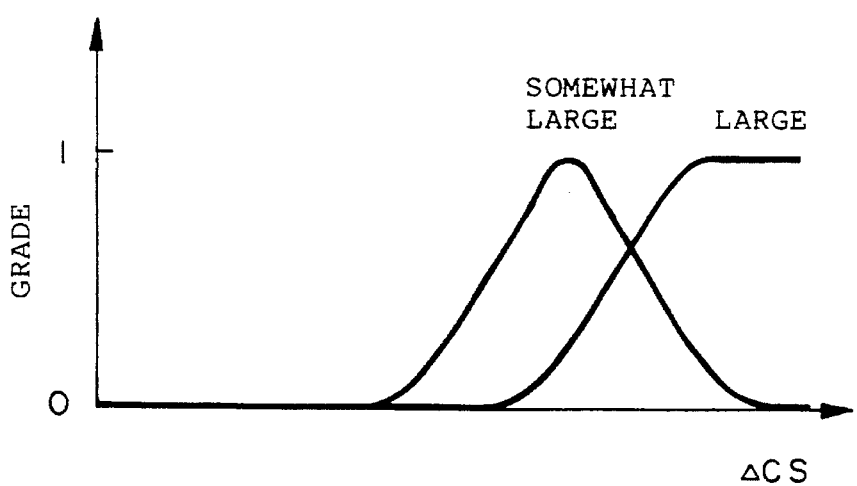
FIG. 27 is a graph illustrating examples of membership functions relating to a character spacing correction quantity ΔCS.

Examples of membership functions regarding the antecedent variables CI, CL and the consequent variable ΔCS are illustrated in FIGS. 25, 26 and 27, respectively.

Basically, this group of rules is for enlarging the character spacing CS(i) slightly in order to improve overall balance in a case where the width of two consecutive characters or the width of four consecutive characters is too small. Accordingly, the antecedent membership functions regarding the variables CI and CL are defined solely with regard to regions in which the values of these variables are small. The consequent membership function relating to the corrective quantity ΔCS is defined solely with regard to a region in which ΔCS is large.

A greater number of membership functions, or membership functions that are different, may be set with regard to CI, CL and ΔCS as needed. The correction rules are not limited to those mentioned above. In addition, the width of three consecutive characters or of five or more consecutive characters inclusive of a character of interest can be adopted as an antecedent variable. A proposition relating to the combination of CI and CL can also be described in the antecedent.

When character spacing is decided in the manner set forth above, the characters arrayed at the character spacing decided are printed. The inference of character spacing is performed based upon a frame (character face) whose size has been determined beforehand in the manner described above, and a character spacing conforming to this size is found.

In the printing of characters, the character size (in points) is designated. Further, the resolution (DPI: dots per inch) of the printer 17 is predetermined. (Even if resolution is variable, the particular resolution is designated in the printing operation.) The number of dots (the numbers of dots longitudinally and transversely of the frame) of one character is decided in dependence upon the designated character size and resolution of the printer 17. The character to be printed is developed in the buffer memory of the printer 17 as a bitmap in the above-mentioned frame size that has been decided. At this time the character spacing decided by inferential reasoning is calculated in dependence upon the size of the frame for printing, and the black dots constructing each character are arrayed at the character spacing calculated.

In the embodiment described above, the processing for inferring character spacing is executed by software. However, the processing can be executed by hardware circuitry. Many types of hardware circuits exclusively for fuzzy reasoning are already known. In addition, it goes without saying that the present invention is applicable also to adjustment of spacing of characters arrayed in the vertical direction.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for adjusting the spacing of characters placed on a readable medium, comprising:

character dot-data generating means for developing character dot data, which represents characters constructing a designated character string, in a memory, wherein each character has a character face;

first characteristic-quantity generating means for generating, character by character, character density data representing broadness of the character face of the character in the character dot data developed in said memory;

second characteristic-quantity generating means for generating, character by character, character face overlap area data representing degree of overlap between both characters in a state in which the character and a character adjacent thereto are closest together in the character dot data developed in said memory;

third characteristic-quantity generating means for generating, character by character, blank-space area data representing broadness of blank space produced between both characters in a state in which the character and the character adjacent thereto are closest together in the character dot data developed in said memory;

character spacing inferring means for inferring an appropriate character spacing character by character by applying the character density data, the character face overlap area data and the blank-space data generated by said first, second and third characteristic-quantity generating means, respectively, to already given knowledge relating to character spacing adjustment; and means for using said appropriate character spacing when placing characters on a readable medium.

2. The apparatus according to claim 1, further comprising:

spacing input means for entering user input spacing data representing a desired degree of character spacing;

said character spacing inferring means inferring the appropriate character spacing by further applying the user input spacing data to said knowledge which includes knowledge for inferring character spacing using the user input spacing data.

3. The apparatus according to claim 1, further comprising:

fourth characteristic-quantity generating means for generating, character by character, first ratio data relating to a ratio of minimum character spacing to character width, where minimum character spacing represents character spacing when the character and the character adjacent thereto are closest together in the character dot data developed in said memory;

said character spacing inferring means inferring the appropriate character spacing by further applying said first ratio data generated by said fourth characteristic-quantity generating means to said knowledge which includes knowledge for inferring character spacing using said first ratio data.

4. The apparatus according to claim 1, further comprising:

fifth characteristic-quantity generating means for generating, character by character, second ratio data relating to a ratio of minimum character spacing to character height, where minimum character spacing represents character spacing when the character and the character adjacent thereto are closest together in the character dot data developed in said memory;

said character spacing inferring means inferring the appropriate character spacing by further applying said second ratio data generated by said fifth characteristic-quantity generating means to said knowledge which includes knowledge for inferring character spacing using said second ratio data.

5. The apparatus according to claim 1, further comprising:

sixth characteristic-quantity generating means for generating, character by character, character overlap complexity data representing complexity with which both characters overlap each other in a state in which the character and the character adjacent thereto are closest together in the character dot data developed in said memory;

said character spacing inferring means inferring the appropriate character spacing by further applying said character overlap complexity data generated by said sixth characteristic-quantity generating means to said knowledge which includes knowledge for inferring character spacing using said character overlap complexity data.

6. The apparatus according to claim 1, further comprising:

means for performing control in such a manner that when the adjacent character is a small character, said character spacing inferring means infers the character spacing with regard to a position at which the small character has been developed into dot data as well as a position to which the small character has been shifted a prescribed number of dots up or down; and means for deciding that the smallest among a plurality of character spacings obtained from said character spacing inferring means is the appropriate character spacing.

7. The apparatus according to claim 1, further comprising:

seventh characteristic-quantity generating means for generating length data relating to length of a row of a plurality of characters, inclusive of a character of interest, arrayed in one row at the character spacing obtained by said character spacing inferring means;

spacing correction-quantity inferring means for inferring a spacing correction quantity for every character of interest by applying length data, which has been generated by said seventh characteristic-quantity generating means, to already given knowledge relating to character spacing correction; and correcting means for generating final character spacing by adding the spacing correction quantity obtained by said spacing correction-quantity inferring means to the character spacing obtained by said character spacing inferring means.

8. The apparatus according to claim 1, wherein said character spacing inferring means is fuzzy reasoning means.

9. The apparatus according to claim 7, wherein said spacing correction-quantity inferring means is fuzzy reasoning means.

10. The apparatus according to claim 1, wherein said using means includes a printer for developing the character dot data, which represents the characters constructing the designated character string, in the memory at a designated character size while maintaining a character spacing corresponding to the obtained character spacing, and printing characters using the character dot data developed.

11. A computerized typesetting system having the apparatus for adjusting character spacing described in claim 1.

12. A word processor having the apparatus for adjusting character spacing described in claim 1.

13. The apparatus according to claim 1, further comprising:
means for performing control in such a manner that when the adjacent character is a small character, said character spacing inferring means infers the character spacing with regard to a position at which the small character has been developed into dot data as well as a position to which the small character has been shifted a prescribed number of dots up or down; and
means for deciding that the smallest among a plurality of character spacings obtained from said character spacing inferring means is the appropriate character spacing.

14. An apparatus for adjusting the spacing of characters placed on a readable medium, comprising:
first characteristic-quantity generating means for generating, character by character, a first characteristic quantity relating to the character in character dot data of a plurality of characters developed in a memory;
second characteristic-quantity generating means for generating, character by character, a second characteristic quantity representing a relationship between the character and a character adjacent thereto in the character dot data of the plurality of characters developed in said memory;
character spacing inferring means for inferring an appropriate character spacing character by character by applying the first characteristic quantity and the second characteristic quantity to knowledge relating to character spacing;
third characteristic-quantity generating means for generating length data relating to length of a row of a plurality of characters, inclusive of a character of interest, arrayed in one row at the character spacing obtained by said character spacing inferring means;
spacing correction-quantity inferring means for inferring a spacing correction quantity for every character of interest by applying length data, which has been generated by said third characteristic-quantity generating means, to already given knowledge relating to character spacing correction;
correcting means for generating final character spacing by adding the spacing correction quantity obtained by said spacing correction-quantity inferring means to the character spacing obtained by said character spacing inferring means; and
means for using said final character spacing when placing characters on a readable medium.

15. The apparatus according to claim 14, wherein said character spacing inferring means infers character spacing while taking into consideration data representing an entered desired degree of character spacing.

16. The apparatus according to claim 14, wherein said character spacing inferring means is fuzzy reasoning means.

17. The apparatus according to claim 13, wherein said spacing correction-quantity inferring means is fuzzy reasoning means.

18. The apparatus according to claim 14, further comprising a printer for developing the character dot data, which represents the characters constructing the designated character string, in the memory at a designated character size while maintaining a character spacing corresponding to the obtained character spacing, and printing characters using the character dot data developed.

19. A computerized typesetting system having the apparatus for adjusting character spacing described in claim 14.

20. A word processor having the apparatus for adjusting character spacing described in claim 14.

21. A method of adjusting the spacing of characters placed on a readable medium, comprising the steps of:
developing character dot data, which represents characters constructing a designated character string, in memory;
generating, character by character, a first characteristic quantity relating to the character in the character dot data of a plurality of characters developed in said memory;
generating, character by character, a second characteristic quantity representing a relationship between the character and a character adjacent thereto in the character data of the plurality of characters developed in said memory;
inferring an appropriate character spacing character by character by applying the first characteristic quantity and the second characteristic quantity to knowledge relating to character spacing adjustment;
generating length data relating to length of a row of a plurality of characters, inclusive of a character of interest, arrayed in one row at the character spacing obtained by inference;
inferring a spacing correction quantity for every character of interest by applying the generated length data to already given knowledge relating to character spacing correction;
generating final character spacing by adding the spacing correction quantity obtained by the inference of spacing correction quantity to the character spacing obtained by the inference of character spacing; and
using said final character spacing when placing characters on a readable medium.

22. The method according to claim 21, further comprising a step of taking data, which represents an entered desired degree of character spacing, into consideration in inference of character spacing.

23. The method according to claim 21, further comprising the steps of:
inferring, when the adjacent character is a small character, the character spacing with regard to a position at which the small character has been developed into dot data as well as a position to which the small character has been shifted a prescribed number of dots up or down; and
deciding that the smallest among a plurality of character spacings obtained by this inference of character spacing is the appropriate character spacing.

24. The method according to claim 21, further comprising the steps of:

developing the character dot data, which represents the characters constructing the designated character string, in the memory at a designated character size while maintaining a character spacing corresponding to the obtained character spacing; and printing characters using the character dot data developed.

25. An apparatus for adjusting the spacing of characters placed on a readable medium, comprising:

character dot-data generating means for developing character dot data, which represents characters constructing a designated character string, in a memory, wherein each character had a character face;

first characteristic-quantity generating means for generating, character by character, character density data representing broadness of the character face of the character in the character dot data developed in said memory;

second characteristic-quantity generating means for generating, character by character, character face overlap area data representing degree of overlap between both characters in a state in which the character and a character adjacent thereto are closest together in the character dot data developed in said memory;

third characteristic-quantity generating means for generating, character by character, blank-space area data representing broadness of blank space produced between both characters in a state in which the character and the character adjacent thereto are closest together in the character dot data developed in said memory;

character spacing deciding means for deciding an appropriate character spacing character by character based upon the character density data, the character face overlap area data and the blank-space area data generating by said first, second and third characteristic-quantity generating means, respectively; and means for using said appropriate character spacing when placing characters on a readable medium.

26. An apparatus for adjusting the spacing of characters placed on a readable medium, comprising:

first characteristic-quantity generating means for generating, character by character, a first characteristic quantity relating to a shape of the character in character dot data of a plurality of characters developed in a memory;

second characteristic-quantity generating means for generating, character by character, a second characteristic quantity representing a shape of the space between adjacent characters in the character dot data of the plurality of characters developed in said memory;

character spacing deciding means for deciding an appropriate character spacing character by character based upon the first characteristic quantity and the second characteristic quantity; and means for using said appropriate character spacing when placing characters on a readable medium.

\* \* \* \* \*